United States Patent
Gauthier Melançon et al.

(10) Patent No.: US 11,562,203 B2
(45) Date of Patent: Jan. 24, 2023

(54) METHOD OF AND SERVER FOR TRAINING A MACHINE LEARNING ALGORITHM FOR ESTIMATING UNCERTAINTY OF A SEQUENCE OF MODELS

(71) Applicant: ELEMENT AI Inc., Montreal (CA)

(72) Inventors: Gabrielle Gauthier Melançon, Montreal (CA); Waseem Gharbieh, Montreal (CA); Iman Malik, Montreal (CA); William Xavier Snelgrove, Montreal (CA)

(73) Assignee: ServiceNow Canada Inc., Montreal (CA)

( * ) Notice: Subject to any disclaimer, the term of this patent is extended or adjusted under 35 U.S.C. 154(b) by 491 days.

(21) Appl. No.: 16/730,008

(22) Filed: Dec. 30, 2019

(65) Prior Publication Data
US 2021/0201112 A1 Jul. 1, 2021

(51) Int. Cl.
*G06N 3/04* (2006.01)
*G06V 10/40* (2022.01)
(Continued)

(52) U.S. Cl.
CPC .......... *G06N 3/0436* (2013.01); *G06N 5/003* (2013.01); *G06N 20/20* (2019.01); *G06V 10/40* (2022.01);
(Continued)

(58) Field of Classification Search
CPC ........ G06V 10/40; G06V 10/82; G06V 30/10; G06V 30/412; G06V 30/19173;
(Continued)

(56) References Cited

U.S. PATENT DOCUMENTS 8,775,341 B1 7/2014 Commons
9,384,423 B2 7/2016 Rodriguez-Serrano et al.
(Continued)

FOREIGN PATENT DOCUMENTS

WO 2018229490 12/2018

OTHER PUBLICATIONS

Hu et al., "According To The Character Of The Social Event Descriptions To Social Emotion Prediction Method and System", published Mar. 2, 2016, CN 102831184 B, p. 10 (Year: 2016).*
(Continued)

*Primary Examiner* — Chau T Nguyen
(74) *Attorney, Agent, or Firm* — Fasken Martineau Dumoulin LLP; Serge Lapointe

(57) ABSTRACT

There is provided a method and server for estimating an uncertainty parameter of a sequence of computer-implemented models comprising at least one machine learning algorithm (MLA). A set of labelled digital documents is received, which is to be processed by the sequence of models. For a given model of the sequence of models, at least one of a respective set of input features, a respective set of model-specific features and a respective set of output features are received. The set of predictions output by the sequence of models is received. A second MLA is trained to estimate uncertainty of the sequence of models based on the set of labelled digital documents, and the at least one of the respective set of input features, the respective set of model-specific features, the respective set of output features, and the set of predictions.

20 Claims, 7 Drawing Sheets

(51) Int. Cl.

| | | |
|---|---|---|
| *G06V 10/82* | (2022.01) | |
| *G06V 30/19* | (2022.01) | |
| *G06N 20/20* | (2019.01) | |
| *G06N 5/00* | (2006.01) | |
| *G06V 30/10* | (2022.01) | |

(52) U.S. Cl.
CPC ........ *G06V 10/82* (2022.01); *G06V 30/19173* (2022.01); *G06V 30/10* (2022.01)

(58) Field of Classification Search
CPC .... G06N 20/10; G06N 3/0427; G06N 3/0436; G06N 3/0445; G06N 3/0454; G06N 3/0481; G06N 3/084; G06N 3/088; G06N 5/003; G06N 7/005; G06N 20/20; G06K 9/6271

See application file for complete search history.

(56) References Cited

U.S. PATENT DOCUMENTS

| | | | |
|---|---|---|---|
| 9,704,256 | B2 | 7/2017 | Grbic et al. |
| 10,074,054 | B2 | 9/2018 | Adams et al. |
| 10,366,233 | B1 | 7/2019 | Feinman et al. |
| 11,003,947 | B2* | 5/2021 | Zoldi .................. G06N 3/0454 |
| 2008/0082352 | A1 | 4/2008 | Schmidtler et al. |
| 2016/0246791 | A1* | 8/2016 | Long ..................... G06F 16/951 |
| 2016/0307067 | A1* | 10/2016 | Filimonova ............ G06V 10/40 |
| 2018/0039907 | A1* | 2/2018 | Kraley .................. G06V 10/82 |
| 2018/0182101 | A1 | 6/2018 | Petersen et al. |
| 2018/0341876 | A1 | 11/2018 | Dipanjan et al. |
| 2019/0122073 | A1 | 4/2019 | Ozdemir et al. |
| 2019/0213473 | A1 | 7/2019 | Dutta et al. |
| 2019/0236132 | A1* | 8/2019 | Zhu ....................... G06N 20/20 |
| 2019/0236482 | A1 | 8/2019 | Desjardins et al. |
| 2019/0304069 | A1* | 10/2019 | Vogels ................. G06N 3/0454 |
| 2019/0378010 | A1* | 12/2019 | Morris ................. G06N 3/0454 |
| 2020/0302016 | A1* | 9/2020 | Aggarwal ............ G06V 30/413 |
| 2021/0192126 | A1* | 6/2021 | Gehrmann ............. G06N 20/00 |

OTHER PUBLICATIONS

Mor et al., Confidence prediction for lexicon-free OCR, 2018 IEEE Winter Conference on Applications of Computer Vision (WACV), pp. 218-225.

DeVries et al., Leveraging uncertainty estimates for predicting segmentation quality, arXiv preprint. arXiv:1807.00502 (2018).

Leibig et al., Leveraging uncertainty information from deep neural networks for disease detection, Scientific reports 7, No. 1 (2017): 17816.

Xiao, Y. et al. "Quantifying Uncertainties in Natural Language Processing Tasks" arXiv.org, pp. 1-8, Nov. 18, 2018 (Nov. 18, 2018), retrieved from https://arxiv.org/abs/1811.07253v1 on Mar. 21, 2021 (Mar. 21, 2021) whole document, in particular: sections 'Introduction', 'Methods', 'Bayesian Neural Networks', 'Uncertainty Quantification', 'Datasets' *.

Solomatine, D.P. et al. "A novel method to estimate model uncertainty using machine learning techniques" Water Resources Research, vol. 45, issue 12, pp. 1-16, Jan. 20, 2009 (Jan. 20, 2009), retrieved from https://agupubs.onlinelibrary.wiley.com/doi/full/10.1029/2008WR006839 on Mar. 21, 2021 (Mar. 21, 2021).

Lakshminarayanan, B. et al. "Simple and Scalable Predictive Uncertainty Estimation using Deep Ensembles", arXiv.org, V3, pp. 1-15, Nov. 4, 2017 (Apr. 11, 2017), retrieved from https://arxiv.org/abs/1612.01474 on Mar. 21, 2021 (Mar. 21, 2021).

* cited by examiner

METHOD OF AND SERVER FOR TRAINING A MACHINE LEARNING ALGORITHM FOR ESTIMATING UNCERTAINTY OF A SEQUENCE OF MODELS

FIELD

The present technology relates to machine learning algorithms (MLAs) in general and more specifically to methods and servers for training a machine learning algorithm for estimating uncertainty of a sequence of models which may include one or more MLAs.

BACKGROUND

Improvements in computer hardware and technology coupled with the multiplication of connected mobile electronic devices have spiked interest in developing solutions for task automatization, outcome prediction, information classification and learning from experience, resulting in the field of machine learning. Machine learning, closely related to data mining, computational statistics and optimization, explores the study and construction of algorithms that can learn from and make predictions on data.

The field of machine learning has evolved extensively in the last decade, giving rise to self-driving cars, speech recognition, image recognition, personalization, and understanding of the human genome. In addition, machine learning enhances different information retrieval activities, such as document searching, collaborative filtering, sentiment analysis, and so forth.

Machine learning algorithms (MLAs) may generally be divided into broad categories such as supervised learning, unsupervised learning and reinforcement learning. Supervised learning consists of presenting a machine learning algorithm with training data consisting of inputs and outputs labelled by assessors, where the goal is to train the machine learning algorithm such that it learns a general rule for mapping inputs to outputs. Unsupervised learning consists of presenting the machine learning algorithm with unlabeled data, where the goal is for the machine learning algorithm to find a structure or hidden patterns in the data. Reinforcement learning consists of having an algorithm evolving in a dynamic environment without providing the algorithm with labeled data or corrections.

Generally, models in machine learning models are prone to errors and may output imperfect predictions, such as predicting a quantity in a regression problem that is different to what was expected, or predicting a class label that does not match what would be expected.

Many applications of machine learning depend on good estimation of the uncertainty: forecasting, decision making, learning from limited, noisy, and missing data, learning complex personalised models, data compression, automating scientific modelling, discovery, and experiment design.

In some fields, uncertainty estimation is critical: for example in medical diagnosis, MLAs may be used for automated cancer detection, or in autonomous vehicles, cars maneuvers may be directed based on obstacles detected by the computer vision algorithms. Thus, quantifying uncertainty, especially when sequences of MLAs are used, may be critical, but also difficult to perform, due to the propagation of the uncertainty between the models, which may cause the output prediction to be Uncertainty may be divided into two types: aleatoric uncertainty, which is irreducible, and epistemic uncertainty, which is attributed to an inadequate knowledge of the model, and which may be reduced by adding or changing parameters of the model, adding or changing features used by the model, and gathering more data for training the model.

While some techniques have been developed to quantify uncertainty of a machine learning model, there is a need for quantifying uncertainty when a sequence of machine learning models is used.

SUMMARY

It is an object of the present technology to ameliorate at least some of the inconveniences present in the prior art. Embodiments of the present technology may provide and/or broaden the scope of approaches to and/or methods of achieving the aims and objects of the present technology.

Developers of the present technology have appreciated that the uncertainty provided by a sequence of computing models comprising one or more MLAs may at least sometimes have a cumulative non-linear effect, where the overall uncertainty at the output of the sequence of models is not proportional to the uncertainty of the individual models in the sequence of models. Further, developers have appreciated that some models in the sequence may provide uncertainty scores with regard to the performed predictions, while other models in the sequence may not provide uncertainty scores for the predictions, thus making the task of estimating "overall" uncertainty quantification difficult.

Developers have also appreciated that a deep neural network trained with objective functions, such as cross-entropy, which should lead to a well calibrated uncertainty estimates empirically tend to be overconfident. For example, a deep learning model used for optical recognition is trained using CTC loss which encourages the model to output extreme confidence values in order to optimize the loss.

Thus, embodiments of the present technology are directed to methods and systems for training a machine learning algorithm for estimating the uncertainty of a sequence of models.

The present technology enables improving performance of models comprising machine learning algorithms by estimating the total uncertainty of the sequence of models based on one or more of input features, output features, model-specific features of the models in the sequence, such that it is interpretable by operators of the sequence of models. This enables, in some cases, to identify out-of-distribution data or dataset shifts that may cause one or more models of a sequence of models to perform less accurately. Further, this enables identifying features which cause the model to perform less accurately, and the data may enable fine-tuning and retraining the models to improve their performance.

In accordance with a broad aspect of the present technology, there is provided a computer-implemented method executed by a first server for training a first machine learning algorithm (MLA) for estimating an uncertainty parameter of a sequence of computer-implemented models executed by a second server, the sequence of computer-implemented models comprising at least one second MLA, the sequence of computer-implemented models having been trained on a set of training objects to output a set of predictions based on a set of input features, the second server executing the first machine learning algorithm (MLA), the second server being communicatively coupled to the first server. The method comprises: receiving, by the first server, a set of labelled digital documents to be processed by the sequence of computer-implemented models, receiving, by the first server, for a given model of the sequence of computer-implemented models, at least one of: a respective set of input features, a respective set of model-specific features, the respective set of model-specific features comprising parameters of the given model, and a respective set of output features predicted by the given model. The method comprises receiving, by the first server, the set of predictions output by the sequence of computer-implemented models. The method comprises training, by the first server, the first MLA based on: the set of labelled digital documents, the at least one of the respective set of input features, the respective set of model-specific features, the respective set of output features, and the respective set of predictions output by the sequence of computer-implemented models to estimate the uncertainty parameter of the sequence of computer-implemented models, the uncertainty parameter being indicative of a confidence level of the set of predictions.

In one embodiment of the method, the training comprises: determining for the sequence of computer-implemented models, at least one of: input validation features, the input validation features being indicative of a format of the set of input features, and output validation features, the output validation features being indicative of a format of the set of predictions.

In one embodiment of the method, the method further comprises, prior to the training the first MLA: receiving, for the respective set of input features, metadata features, the metadata features not being used by the given model, and the training the first MLA is further based on the metadata features.

In one embodiment of the method, the given model is the at least one second MLA.

In one embodiment of the method, the at least one second MLA comprises a neural network (NN).

In one embodiment of the method, the model-specific features comprise model parameters and hyperparameters of the at least one second MLA.

In one embodiment of the method, the model-specific features comprise intermediate features computed by the at least one second MLA.

In one embodiment of the method, the method further comprises, prior to the training the first MLA: receiving, from the given model of the sequence of computer-implemented models, a respective uncertainty score associated with the respective set of output features, the uncertainty score being indicative of a confidence level the respective set of output features of the given model, and the training the first MLA is further based on the respective uncertainty score.

In one embodiment of the method, the training the first MLA comprises performing stochastic gradient descent.

In one embodiment of the method, the first MLA is a classification model, and the uncertainty parameter is a binary variable.

In one embodiment of the method, the first MLA is a gradient boosted decision tree.

In one embodiment of the method, the digital document is an image having structured elements, and the sequence of computer-implemented models has been trained to determine bounding boxes from the image having the structured elements and output a set of text sequences using optical character recognition (OCR) from the image.

In one embodiment of the method, the image is an application form.

In one embodiment of the method, the model-specific features comprise: log probabilities of predictions of an OCR model in the sequence of computer-implemented models, and a mean and a variance of the log probabilities of the predictions.

In one embodiment of the method, the output validation features comprise at least one of: a length of characters of a given text sequence in the set of text sequences, a number of alphabetical characters of the given text sequence, and a number of numerical characters of the given text sequence.

In one embodiment of the method, the first server and the second server are a single server.

In accordance with another broad aspect of the present technology, there is provided a first server for training a first machine learning algorithm (MLA) for estimating an uncertainty parameter of a sequence of computer-implemented models executed by a second server, the sequence of computer-implemented models comprising at least one second MLA, the sequence of computer-implemented models having been trained on a set of training objects to output a set of predictions based on a set of input features, the second server being communicatively coupled to the first server, the first server comprising: a processor operatively connected to a non-transitory computer readable storage medium comprising instructions. The processor, upon executing the instructions is configured for: receiving a set of labelled digital documents to be processed by the sequence of computer-implemented models, receiving, for a given model of the sequence of computer-implemented models, at least one of: a respective set of input features, a respective set of model-specific features, the respective set of model-specific features comprising parameters of the given model, and a respective set of output features predicted by the given model. The processor is configured for receiving the set of predictions output by the sequence of computer-implemented models. The processor is configured for training the first MLA based on: the set of labelled digital documents, the at least one of the respective set of input features, the respective set of model-specific features, the respective set of output features, and the respective set of predictions output by the sequence of computer-implemented models to estimate an uncertainty parameter of the sequence of computer-implemented models, the uncertainty parameter being indicative of a confidence level of the set of predictions.

In one embodiment of the first server, the training comprises: determining for the sequence of computer-implemented models, at least one of: input validation features, the input validation features being indicative of a format of the set of input features, and output validation features, the output validation features being indicative of a format of the set of predictions.

In one embodiment of the first server, prior to the training the first MLA, the processor is further configured for: receiving, for the respective set of input features, metadata features, the metadata features not being used by the given model, and the training the first MLA is further based on the metadata features.

In one embodiment of the first server, the given model is the at least one second MLA.

In one embodiment of the first server, the at least one second MLA comprises a neural network (NN).

In one embodiment of the first server, the model-specific features comprise model parameters and hyperparameters of the at least one second MLA.

In one embodiment of the first server, the model-specific features comprise intermediate features computed by the at least one second MLA.

In one embodiment of the first server, prior to the training the first MLA, the processor is further configured for: receiving, from the given model of the sequence of computer-implemented models, a respective uncertainty score associated with the respective set of output features, the uncertainty score being indicative of a confidence level the respective set of output features of the given model, and the training the first MLA is further based on the respective uncertainty score.

In one embodiment of the first server, the training the first MLA comprises performing stochastic gradient descent.

In one embodiment of the first server, the first MLA is a classification model, and the uncertainty parameter is a binary variable.

In one embodiment of the first server, the first MLA is a gradient boosted decision tree.

In one embodiment of the first server, the digital document is an image having structured elements, and the sequence of computer-implemented models has been trained to determine bounding boxes from the image having the structured elements and output a set of text sequences using optical character recognition (OCR) from the image.

In one embodiment of the first server, the image is an application form.

In one embodiment of the first server, the model-specific features comprise: log probabilities of predictions of an OCR model in the sequence of computer-implemented models, and a mean and variance of the log probabilities of the predictions.

In one embodiment of the first server, the output validation features comprise at least one of: a length of characters of a given text sequence in the set of text sequences, a number of alphabetical characters of the given text sequence, and a number of numerical characters of the given text sequence.

Embedding

An embedding is a mapping of an object or variable to a vector of continuous numbers. Embeddings enable performing operations such as measuring a similarity between two objects in the embedding space. Applied to machine learning, embeddings are useful for reducing the dimensionality of categorical variables and meaningfully represent similarity between categories in the transformed space.

Machine Learning Algorithms (MLA)

A machine learning algorithm is a process or sets of procedures that helps a mathematical model adapt to data given an objective. An MLA normally specifies the way the feedback is used to enable the model to learn the appropriate mapping from input to output. The model specifies the mapping function and holds the parameters while the learning algorithm updates the parameters to help the model satisfy the objective.

MLAs may generally be divided into broad categories such as supervised learning, unsupervised learning and reinforcement learning. Supervised learning involves presenting a machine learning algorithm with training data consisting of inputs and outputs labelled by assessors, where the objective is to train the machine learning algorithm such that it learns a general rule for mapping inputs to outputs. Unsupervised learning involves presenting the machine learning algorithm with unlabeled data, where the objective is for the machine learning algorithm to find a structure or hidden patterns in the data. Reinforcement learning involves having an algorithm evolving in a dynamic environment guided only by positive or negative reinforcement.

Models used by the MLAs include neural networks (including deep learning), decision trees, support vector machines (SVMs), Bayesian networks, and genetic algorithms.

Neural Networks (NNs)

Neural networks (NNs), also known as artificial neural networks (ANNs) are a class of non-linear models mapping from inputs to outputs and comprised of layers that can potentially learn useful representations for predicting the outputs. Neural networks are typically organized in layers, which are made of a number of interconnected nodes that contain activation functions. Patterns may be presented to the network via an input layer connected to hidden layers, and processing may be done via the weighted connections of nodes. The answer is then output by an output layer connected to the hidden layers. Non-limiting examples of neural networks includes: perceptrons, back-propagation, hopfield networks.

Multilayer Perceptron (MLP)

A multilayer perceptron (MLP) is a class of feedforward artificial neural networks. An MLP consists of at least three layers of nodes: an input layer, a hidden layer and an output layer. Except for the input nodes, each node is a neuron that uses a nonlinear activation function. An MLP uses a supervised learning technique called backpropagation for training. An MLP can distinguish data that is not linearly separable.

Convolutional Neural Network (CNN)

A convolutional neural network (CNN or ConvNet) is a NN which is a regularized version of an MLP. A CNN uses convolution in place of general matrix multiplication in at least one layer.

Recurrent Neural Network (RNN)

A recurrent neural network (RNN) is a NN where connection between nodes form a directed graph along a temporal sequence. This allows it to exhibit temporal dynamic behavior. Each node in a given layer is connected with a directed (one-way) connection to every other node in the next successive layer. Each node (neuron) has a time-varying real-valued activation. Each connection (synapse) has a modifiable real-valued weight. Nodes are either input nodes (receiving data from outside the network), output nodes (yielding results), or hidden nodes (that modify the data going from input to output).

Gradient Boosting

Gradient boosting is one approach to building an MLA based on decision trees, whereby a prediction model in the form of an ensemble of trees is generated. The ensemble of trees is built in a stage-wise manner Each subsequent decision tree in the ensemble of decision trees focuses training on those previous decision tree iterations that were "weak learners" in the previous iteration(s) of the decision trees ensemble (i.e. those that are associated with poor prediction/high error).

Generally speaking, boosting is a method aimed at enhancing prediction quality of the MLA. In this scenario, rather than relying on a prediction of a single trained algorithm (i.e. a single decision tree) the system uses many trained algorithms (i.e. an ensemble of decision trees), and makes a final decision based on multiple prediction outcomes of those algorithms.

In boosting of decision trees, the MLA first builds a first tree, then a second tree, which enhances the prediction outcome of the first tree, then a third tree, which enhances the prediction outcome of the first two trees and so on. Thus, the MLA in a sense is creating an ensemble of decision trees, where each subsequent tree is better than the previous, specifically focusing on the weak learners of the previous iterations of the decision trees. Put another way, each tree is built on the same training set of training objects, however training objects, in which the first tree made "mistakes" in predicting are prioritized when building the second tree, etc. These "tough" training objects (the ones that previous iterations of the decision trees predict less accurately) are weighted with higher weights than those where a previous tree made satisfactory prediction.

Examples of deep learning MLAs include: Deep Boltzmann Machine (DBM), Deep Belief Networks (DBN), Convolutional Neural Network (CNN), and Stacked Auto-Encoders.

Examples of ensemble MLAs include: Random Forest, Gradient Boosting Machines (GBM), Boosting, Bootstrapped Aggregation (Bagging), AdaBoost, Stacked Generalization (Blending), Gradient Boosted Decision Trees (GBDT) and Gradient Boosted Regression Trees (GBRT).

Examples of NN MLAs include: Radial Basis Function Network (RBFN), Perceptron, Back-Propagation, and Hopfield Network Examples of Regularization MLAs include: Ridge Regression, Least Absolute Shrinkage and Selection Operator (LASSO), Elastic Net, and Least Angle Regression (LARS).

Examples of Rule system MLAs include: Cubist, One Rule (OneR), Zero Rule (ZeroR), and Repeated Incremental Pruning to Produce Error Reduction (RIPPER).

Examples of Regression MLAs include: Linear Regression, Ordinary Least Squares Regression (OLSR), Stepwise Regression, Multivariate Adaptive Regression Splines (MARS), Locally Estimated Scatterplot Smoothing (LOESS), and Logistic Regression.

Examples of Bayesian MLAs include: Naive Bayes, Averaged One-Dependence Estimators (AODE), Bayesian Belief Network (BBN), Gaussian Naive Bayes, Multinomial Naive Bayes, and Bayesian Network (BN).

Examples of Decision Trees MLAs include: Classification and Regression Tree (CART), Iterative Dichotomiser 3 (103), C4.5, C5.0, Chi-squared Automatic Interaction Detection CCHAID), Decision Stump, Conditional Decision Trees, and M5.

Examples of Dimensionality Reduction MLAs include: Principal Component Analysis (PCA), Partial Least Squares Regression (PLSR), Sammon Mapping, Multidimensional Scaling (MDS), Projection Pursuit, Principal Component Regression (PCR), Partial Least Squares Discriminant Analysis, Mixture Discriminant Analysis (MDA), Quadratic Discriminant Analysis (QDA), Regularized Discriminant Analysis (RDA), Flexible Discriminant Analysis (FDA), and Linear Discriminant Analysis (LOA).

Examples of Instance Based MLAs include: k-Nearest Neighbour (kNN), Learning Vector Quantization (LVQ), Self-Organizing Map (SOM), Locally Weighted Learning (LWL).

Examples of Clustering MLAs include: k-Means, k-Medians, Expectation Maximization, and Hierarchical Clustering.

In the context of the present specification, a "character" is a single symbol in a predefined, finite alphabet of characters (e.g., all or a subset of the ASCII character set). No character in the alphabet includes more than one symbol. A "word" includes a set of characters drawn from the alphabet, and although some words may consist of a single character, at least some of the words in dialog act or a text sequence include at least two, or at least three, or at least four of the characters. As defined herein, "words" can include number sequences, punctuation, and the like, and need not be defined in a dictionary. A "text sequence" is a sequence of words and while some text sequences may consist of a single word, at least some text sequences include at least two, or at least three, or at least four words.

In the context of the present specification, a "server" is a computer program that is running on appropriate hardware and is capable of receiving requests (e.g., from electronic devices) over a network (e.g., a communication network), and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expressions "at least one server" and "a server".

In the context of the present specification, "electronic device" is any computing apparatus or computer hardware that is capable of running software appropriate to the relevant task at hand. Thus, some (non-limiting) examples of electronic devices include general purpose personal computers (desktops, laptops, netbooks, etc.), mobile computing devices, smartphones, and tablets, and network equipment such as routers, switches, and gateways. It should be noted that an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein. In the context of the present specification, a "client device" refers to any of a range of end-user client electronic devices, associated with a user, such as personal computers, tablets, smartphones, and the like.

In the context of the present specification, the expression "computer readable storage medium" (also referred to as "storage medium" and "storage") is intended to include non-transitory media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus, information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the expression "communication network" is intended to include a telecommunications network such as a computer network, the Internet, a telephone network, a Telex network, a TCP/IP data network (e.g., a WAN network, a LAN network, etc.), and the like. The term "communication network" includes a wired network or direct-wired connection, and wireless media such as acoustic, radio frequency (RF), infrared and other wireless media, as well as combinations of any of the above.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
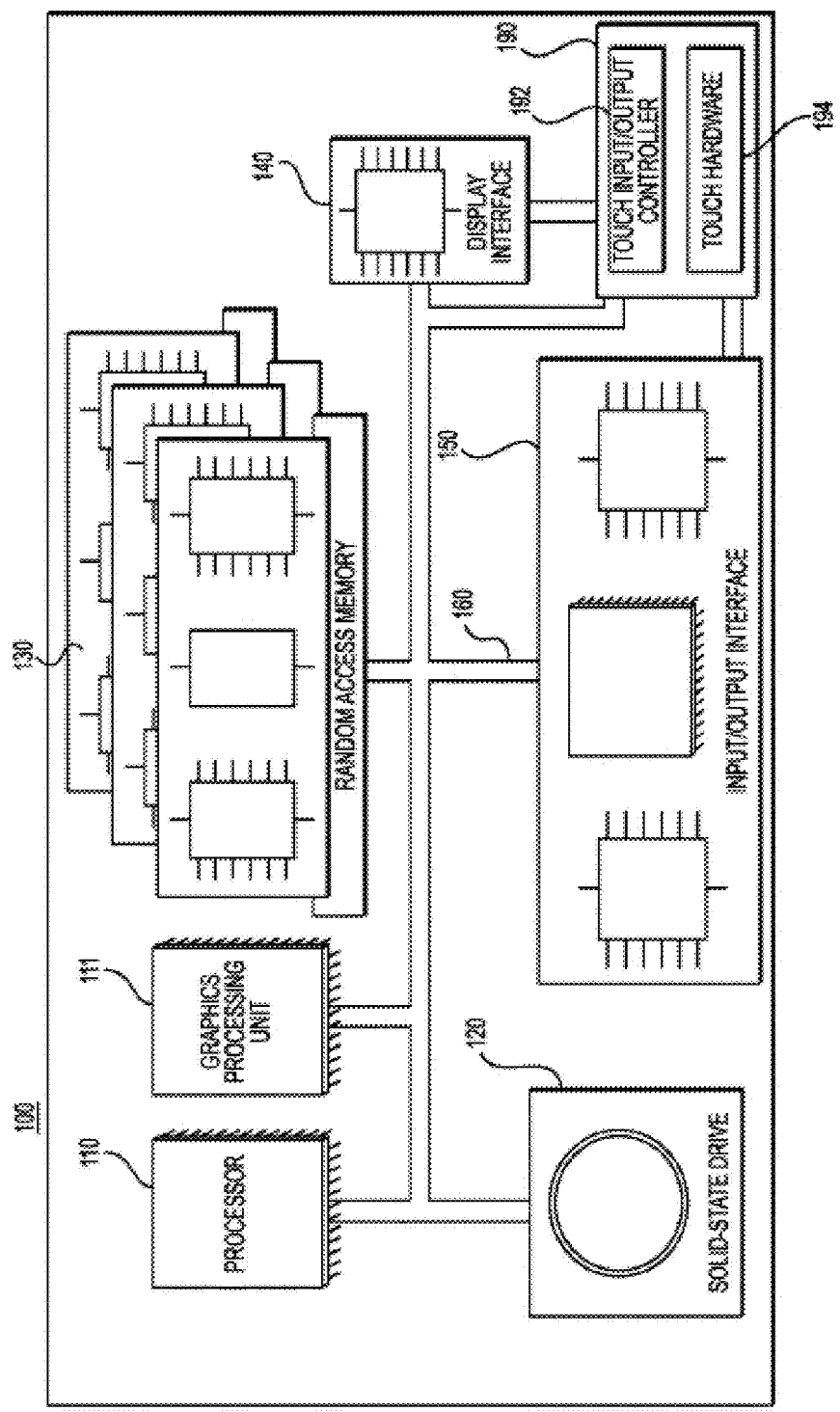
FIG. 1 depicts a schematic diagram of an electronic device in accordance with non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some non-limiting embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Electronic Device

Referring to FIG. 1, there is shown an electronic device 100 suitable for use with some implementations of the present technology, the electronic device 100 comprising various hardware components including one or more single or multi-core processors collectively represented by processor 110, a graphics processing unit (GPU) 111, a solid-state drive 120, a random access memory 130, a display interface 140, and an input/output interface 150.

Communication between the various components of the electronic device 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In some embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some embodiments, the input/output interface 150 may be connected to a keyboard (not shown), a mouse (not shown) or a trackpad (not shown) allowing the user to interact with the electronic device 100 in addition or in replacement of the touchscreen 190.

According to implementations of the present technology, the solid-state drive 120 stores program instructions suitable for being loaded into the random-access memory 130 and executed by the processor 110 and/or the GPU 111 for generating a reduced molecular graph of a given molecule. For example, the program instructions may be part of a library or an application.

The electronic device 100 may be implemented as a server, a desktop computer, a laptop computer, a tablet, a smartphone, a personal digital assistant or any device that may be configured to implement the present technology, as it may be understood by a person skilled in the art.

System

Figure 2:
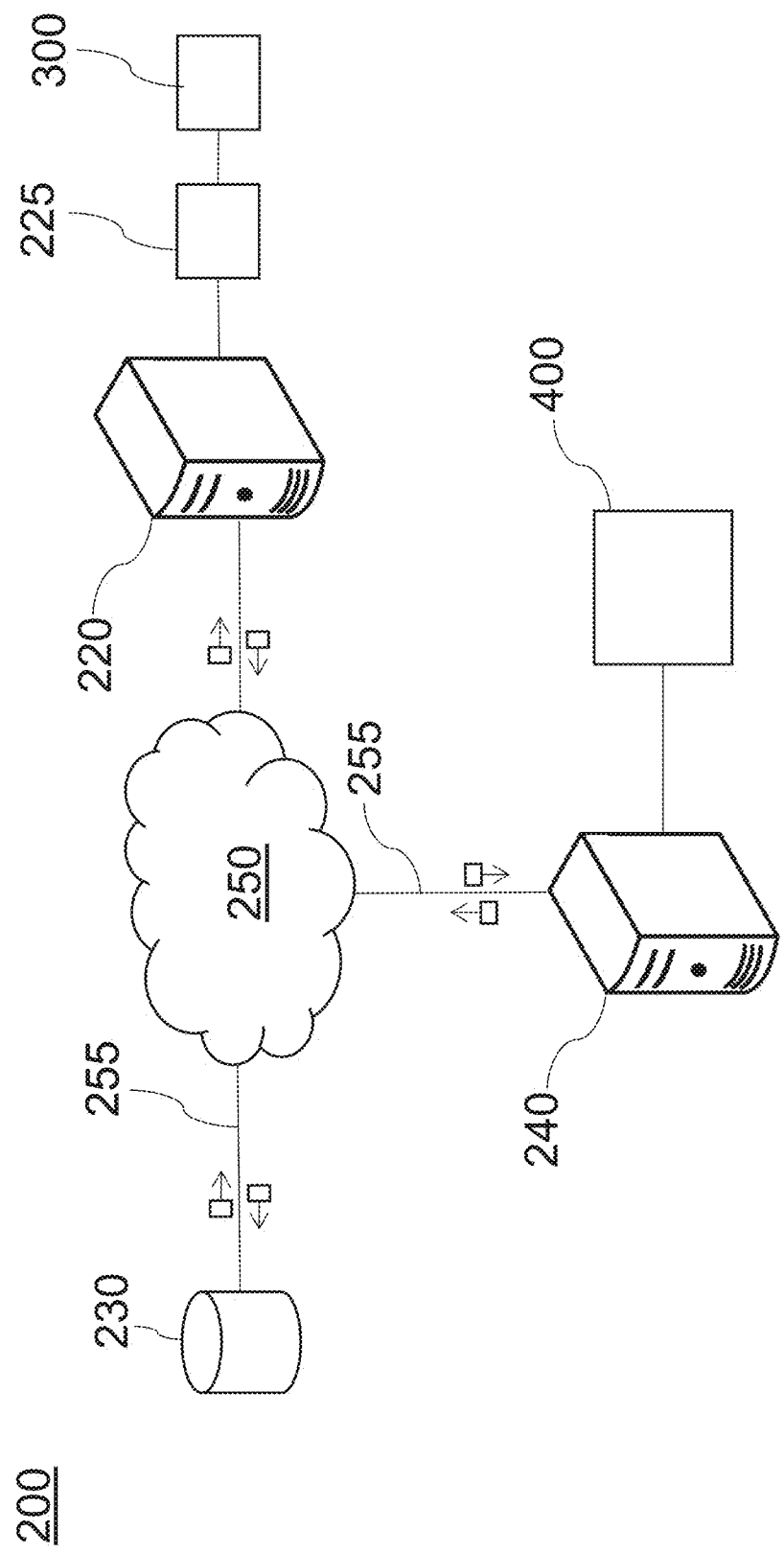
FIG. 2 depicts a schematic diagram of a system in accordance with non-limiting embodiments of the present technology.

Referring to FIG. 2, there is shown a schematic diagram of a system 200, the system 200 being suitable for implementing non-limiting embodiments of the present technology. It is to be expressly understood that the system 200 as shown is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 200 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 200 may provide in certain instances simple implementations of the present technology, and that where such is the case they have been presented in this manner as an aid to understanding. As persons skilled in the art would understand, various implementations of the present technology may be of a greater complexity.

The system 200 comprises inter alia a prediction server 220, a database 230, and a training server 240 communicatively coupled over a communications network 250.

Prediction Server

Generally speaking, the prediction server 220 is configured to: (i) execute a sequence of models 300; (ii) receive data to be processed by the sequence of models 300; (iii) process the data via the sequence of models 300 to output predictions; and (iv) provide an application programming interface (API) 225.

The prediction server 220 is configured to execute the sequence of models 300. Briefly speaking, the sequence of models 300, which will be explained in more detail herein below, comprises one or more MLAs (not shown in FIG. 2) and is configured to receive input data, and process the data using the models to output a final prediction.

In one embodiment, the prediction server 220 provides the sequence of models 300 over the Internet, which are accessible as a non-limiting example by the training server 240 or client devices (not shown). The manner in which the sequence of models 300 are accessible is not limited, and may be for example subscription based, however this does not need to be so in every embodiment of the present technology. In one embodiment, the training server 240 may have permission to access configuration parameters of the sequence of models 300 executed by the prediction server 220.

In one embodiment, the prediction server 220 is configured to provide an API 225, which enables accessing the sequence of models 300. The API 225 is an interface or communication protocol between the prediction server 220 and electronic devices connected thereto, such as the training server 240. The API 225 may be for example web-based, a database system, or implemented in computer hardware and/or a software library.

The API 225 may be used by electronic devices connected to the prediction server 220 to access and provide input data to the sequence of models 300 for processing thereof, and receiving the predictions output by the sequence of models 300.

The prediction server 220 can be implemented as a conventional computer server and may comprise at least some of the features of the electronic device 100 shown in FIG. 1. In a non-limiting example of an embodiment of the present technology, the prediction server 220 can be implemented as a server running the Microsoft™ Windows Server™ operating system. Needless to say, the prediction server 220 can be implemented in any other suitable hardware and/or software and/or firmware or a combination thereof. In the shown non-limiting embodiment of present technology, the prediction server 220 is a single server. In alternative non-limiting embodiments of the present technology, the functionality of the prediction server 220 may be distributed and may be implemented via multiple servers (not shown).

The implementation of the prediction server 220 is well known to the person skilled in the art of the present technology. However, briefly speaking, the prediction server 220 comprises a communication interface (not shown) structured and configured to communicate with various entities (such as the database 230, for example and other devices potentially coupled to the network) via the network. The prediction server 220 further comprises at least one computer processor (e.g., the processor 110 of the electronic device 100) operationally connected with the communication interface and structured and configured to execute various processes to be described herein.

In one embodiment, the prediction server 220 executes a training procedure of one or more of the MLAs of the sequence of models 300. In another embodiment, the training procedure of one or more of the MLAs of the sequence of models 300 may be executed by another electronic device (not shown), and the one or more of the MLAs of the sequence of models 300 may be transmitted to the prediction server 220 over the communications network 250.

In one embodiment, the prediction server 220 provides a machine learning service API with the sequence of models 300 through the API 225.

Non-limiting examples of machine-learning APIs include: BigML™, PredictionIO™, and TensorFlow™ API.

Database

A database 230 is communicatively coupled to the prediction server 220 via the communications network 250 but, in alternative implementations, the database 230 may be communicatively coupled to the prediction server 220 without departing from the teachings of the present technology. Although the database 230 is illustrated schematically herein as a single entity, it is contemplated that the database 230 may be configured in a distributed manner, for example, the database 230 could have different components, each component being configured for a particular kind of retrieval therefrom or storage therein.

The database 230 may be a structured collection of data, irrespective of its particular structure or the computer hardware on which data is stored, implemented or otherwise rendered available for use. The database 230 may reside on the same hardware as a process that stores or makes use of the information stored in the database 230 or it may reside on separate hardware, such as on the prediction server 220. Generally speaking, the database 230 may receive data from the prediction server 220 for storage thereof and may provide stored data to the prediction server 220 for use thereof.

In some embodiments of the present technology, the prediction server 220 may be configured to store in the database 230 digital images, as well as OCR representations of the digital images comprising text sequences and structural elements of the text sequences. At least some information stored in the database 230 may be predetermined by an operator and/or collected from a plurality of external resources.

The database 230 may also configured to store information for training the sequence of models 300, such as training datasets, which may include training objects such as digital images or documents with text sequences, textual elements as well as labels of the text sequences and/or structural elements.

Training Server

The system 200 also comprises the training server 240.

Generally speaking, the training server 240 is configured to: (i) execute one or more MLAs in the form of the uncertainty quantifier 400 to be used for uncertainty quantification; (ii) connect to the prediction server 220 via the API 225 for data communication; (iii) train the uncertainty quantifier 400; and (iv) quantify uncertainty of the sequence of models 300 executed by the prediction server 220 via the uncertainty quantifier 400.

In some non-limiting embodiments of the present technology, the training server 240 is further configured to: (v) generate training data for the sequence of models 300; and (vi) retrain the sequence of models 300.

Briefly speaking, the uncertainty quantifier 400 is configured to determine uncertainty of the sequence of models 300 executed by the prediction server 220. To achieve that purpose, the uncertainty quantifier 400 comprises at least one MLAs having access to features and parameters used by the sequence of models 300 and which is trained to assess uncertainty based on the features and the parameters. How the uncertainty quantifier 400 is configured to do so will be explained in more detail herein below with reference to FIG. 4.

Similarly to the prediction server 220, the training server 240 can be implemented as a conventional computer server and may comprise some or all of the features of the electronic device 100 shown in FIG. 1. In a non-limiting example of an embodiment of the present technology, the training server 240 can be implemented as a server running the Microsoft™ Windows Server™ operating system. Needless to say, the training server 240 can be implemented in any other suitable hardware and/or software and/or firmware or a combination thereof. In the shown non-limiting embodiment of present technology, the training server 240 is a single server. In alternative non-limiting embodiments of the present technology, the functionality of the training server 240 may be distributed and may be implemented via multiple servers (not shown).

The implementation of the training server 240 is well known to the person skilled in the art of the present technology. However, briefly speaking, the training server 240 comprises a communication interface (not shown) structured and configured to communicate with various entities (such as the prediction server 220 and the database 230, for example and other devices potentially coupled to the network) via the network. The training server 240 further comprises at least one computer processor (e.g., the processor 110 of the electronic device 100) operationally connected with the communication interface and structured and configured to execute various processes to be described herein.

In some non-limiting embodiments of the present technology, the prediction server 220 and the training server 240 may be implemented as a single server. In other non-limiting embodiments, functionality of the prediction server 220 and the training server 240 may distributed among a plurality of electronics devices.

Communication Network

In some embodiments of the present technology, the communications network 250 is the Internet. In alternative non-limiting embodiments, the communication network 250 can be implemented as any suitable local area network (LAN), wide area network (WAN), a private communication network or the like. It should be expressly understood that implementations for the communication network 250 are for illustration purposes only. How a communication link 255 (not separately numbered) between the prediction server 220, the database 230, the training server 240 and/or another electronic device (not shown) and the communications network 250 is implemented will depend inter alia on how each electronic device is implemented.

Sequence of Models

Figure 3:
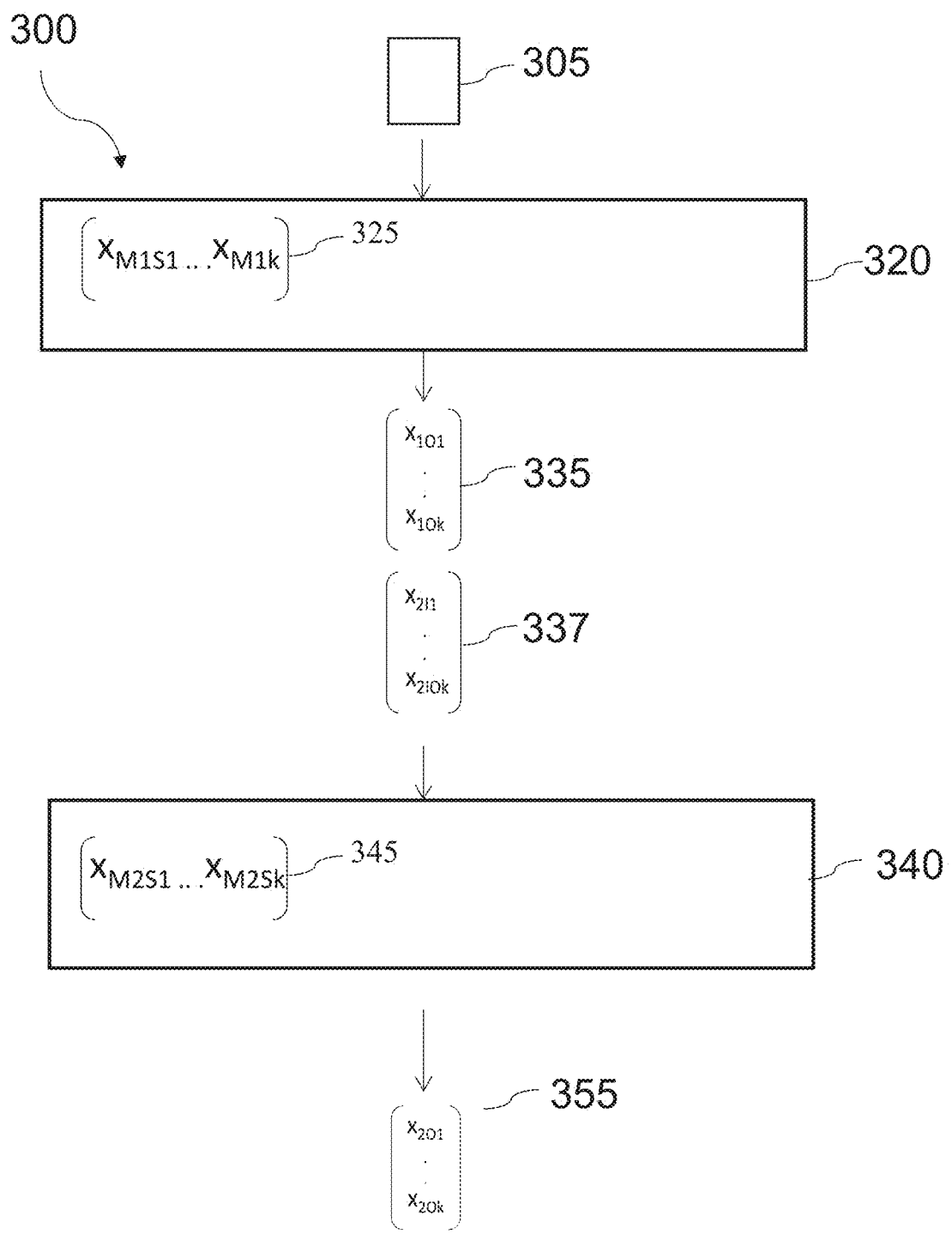
FIG. 3 depicts a schematic diagram of a sequence of models in accordance with non-limiting embodiments of the present technology.

With reference to FIG. 3, there is shown a sequence of models 300 in accordance with non-limiting embodiments of the present technology.

In one embodiment of the present technology, the prediction server 220 executes the sequence of models 300, where the sequence of models 300 is a sequence of computer-implemented models. In alternative embodiments, the prediction server 220 may execute at least a portion of the sequence of models 300, and one or more other servers (not shown) may execute other portions of the sequence of models. In another embodiment, the training server 240 executes at least a portion of the sequence of models 300.

The sequence of models 300 receives input data. In one embodiment, the sequence of models 300 receives the input data from the database 230. In the same or another embodiment, the sequence of models 300 receives the input data from the training server 240.

The sequence of models 300 receives the input data in the form of a digital document 305. The digital document 305 may for example comprise text sequences, image, audio, video or a combination thereof. It should be understood that the type and format of the input data in the form of the digital document 305 depends on the specific application of the sequence of models 300.

As a first non-limiting example, the sequence of models 300 may be used for speech recognition, where the input digital document 305 is an audio clip including speech and from which the sequence of models 300 outputs text. As another non-limiting example, the sequence of models 300 may be used for music generation, where the input digital document 305 is an integer referring to a genre or an empty set from which the sequence of models 300 outputs a music audio clip. As a further non-limiting example, the sequence of models 300 may be used for sentiment classification, where the input digital document 305 is text from which the sequence of models 300 outputs ratings. As still another non-limiting example, the sequence of models 300 may be used for DNA sequence analysis where the input digital document 305 is a DNA alphabet from which the sequence of models 300 outputs labels part of the DNA sequence. As still a further non-limiting example, the sequence of models 300 may be used for machine translation where the input digital document 305 is text from which the sequence of models 300 outputs a text translation. As another non-limiting example, the sequence of models 300 may be used for video activity recognition where the input are video frames from which the sequence of models 300 outputs identification of the activity in the video frame. As another non-limiting example, the sequence of models 300 may be used for name entity recognition where the input digital document 305 is a text sentence from which the sequence of models 300 outputs identified people in the sentence.

Thus, the sequence of models 300 is configured to receive input data in the form of the digital document 305 and process the digital document 305 to output as prediction a set of output features, i.e. the set of second model output features 355.

The sequence of models 300 comprises inter alia a first model 320, and a second model 340. In some embodiments, the sequence of models 300 further comprises a third model (not shown), and a fourth model (not shown). It should be understood that the number of models in the sequence of models 300 is not limited. The sequence of models 300 comprises one or more MLAs. In one embodiment, the first model 320 and/or the second model 340 are MLAs.

The first model 320 is configured to: (i) receive as an input the digital document 305; (ii) process the digital document 305 using the set of first model parameters 325 to output a set of first model output features 335.

In one embodiment, the first model 320 is an MLA. The first model 320 may be a neural network or a deep learning network for example. The first model 320 may thus be trained to output the set of first model output features 335 using the set of first model parameters 325.

In one embodiment, the first model 320 receives the digital document 305 in "raw" data form, and processes the digital document 305 to extract and output features therefrom, which may be used downstream the first model 320, i.e. by the second model 340 and in some embodiments by the third model (not shown) and/or the fourth model (not shown) and other models, without departing from the scope of the present technology. In another embodiment, the first model 320 receives the digital document 305 in processed data form.

Generally speaking, the first model 320 has a set of first model parameters 325. In some embodiments, where the first model 320 is implemented as a neural network, the set of first model parameters 325 comprises: model parameters and hyperparameters.

The model parameters are configuration variables of the first model 320 required by the first model 320 to perform predictions and which are estimated or learned from training data, i.e. the coefficients are chosen during learning based on an optimization strategy for outputting the prediction.

In embodiments where the first model 320 is implemented as a neural network, the model parameters includes weights.

In embodiments where the first model 320 is implemented as a support vector machine, the model parameters include support vectors.

In embodiments where the first model 320 is implemented as linear regression model or a logistic regression model, the model parameters include coefficient in the linear regression or the logistic regression.

The hyperparameters are elements that may be set by an operator and which may not be updated by the first model

320 during training. In one embodiment, the hyperparameters include one or more of: a number of hidden layers, an optimization algorithm, a learning rate, an activation function, a minibatch size, a number of epochs, and dropout.

Non-limiting examples of activation functions include: a sigmoid function, a softmax function, a tan h function, and a ReLu function.

In some embodiments, the first model 320 processes the digital document 305 in a series of steps, and may output, at each step, a respective set of features (not shown) which are used at subsequent steps to output the set of first model output features 335. As a non-limiting example, in embodiments where the first model 320 is a NN, the first model 320 may output features at each layer of the NN.

The first model 320 processes the digital document 305 based on the set of first model parameters 322 to output a set of first model output features 335.

In embodiments where the digital document 305 is a text sequence, the set of first model output features 335 comprises one or more of: term frequency inverse document frequency (TF-IDF) of the text sequence, semantic features of the text sequence, grammatical features of the text sequence, and lexical features of the text sequence, character embeddings, word embeddings, and the like.

In embodiments where the digital document 305 is an image, the first set of features comprises one or more of: color features or descriptors, texture features or descriptors, shape features or descriptors, and the like. Non-limiting examples of color features include RGB, HSV, HSL and HIS.

The first model 320 outputs the set of first model output features 335.

In one embodiment, the first model 320 outputs a first model uncertainty parameter associated with the set of first model output features 335. The first model uncertainty parameter indicates a confidence level of the first model 320 with regard to the one or more output predictions, i.e. the set of first model output features 335.

Second Model

The second model 340 receives a set of second model input features 337, the second set of second model input features 337 comprising at least a portion of the set of first model output features 335.

In one embodiment, the set of second model input features 337 may be the set of first model output features 335. In another embodiment, the set of second model input features 337 may comprise additional input features not having been output by the first model 320. As a non-limiting example, the set of second model input features 337 may comprise features related to the digital document 305 that have not been used by the first model 320.

In one embodiment, the second model 340 is an MLA which may be of a different type than the first model 320. In another embodiment, the second model 340 is a heuristic.

The second model 340 has a set of second model parameters 345. In one embodiment, similarly to the set of first model parameters 325, the set of second model parameter 345 may include model parameters and hyperparameters.

The second model 340 processes the set of second model input features 337 based on the set of second model parameters 345 to output one or more predictions in the form of a set of second model output features 355. The set of second model output features 355 are predictions performed by the second model 340. It should be understood that the nature of the set of second model output features 355 is not limited and depends on how the sequence of models 300 is implemented. The set of second model output features 355 may comprise one or more values, may be a binary value, a text sequence, and the like. As a non-limiting example, in computer vision applications, the set of second model output features 355 may comprise coordinates of detected objects in the digital document 305 and their respective classes. In one embodiment, the set of second model output features 355 may be post-processed by the second model 340 or another model to be in a human-readable format.

In one embodiment, the second model 340 outputs an uncertainty parameter associated with the set of second model output features 355. The uncertainty parameter indicates a confidence level of the second model 340 with regard to the one or more output predictions, i.e. the set of second model output features 355. As a non-limiting example, the uncertainty parameter may be a vector comprising confidence values for each of the predictions performed by the second model 340 in the set of second model output features 355.

In some embodiments, the set of second model output features 355 is a final set of features. In one embodiment, the second model 340 stores the set of second model output features 355 in the database 230. In another embodiment, where the sequence of models 300 has received the digital document 305 via the API 225 from the training server 240 or a client device (not shown), the sequence of models 300 transmits the set of second model output features 355 to the training server 240 or the client device (not shown).

The sequence of models 300 may be trained and validated using techniques known in the art. In one embodiment, the sequence of models 300 is trained using a set of training objects, where training objects are labelled with the target output.

It should be noted that some models in the sequence of models 300 may have been trained and validated individually before being trained and validated as part of the sequence of models 300.

In some embodiments, the first model 320 and/or the second model 340 may be trained to optimize an objective function, i.e. minimize or maximize the objective function.

Uncertainty Quantifier

Figure 4:
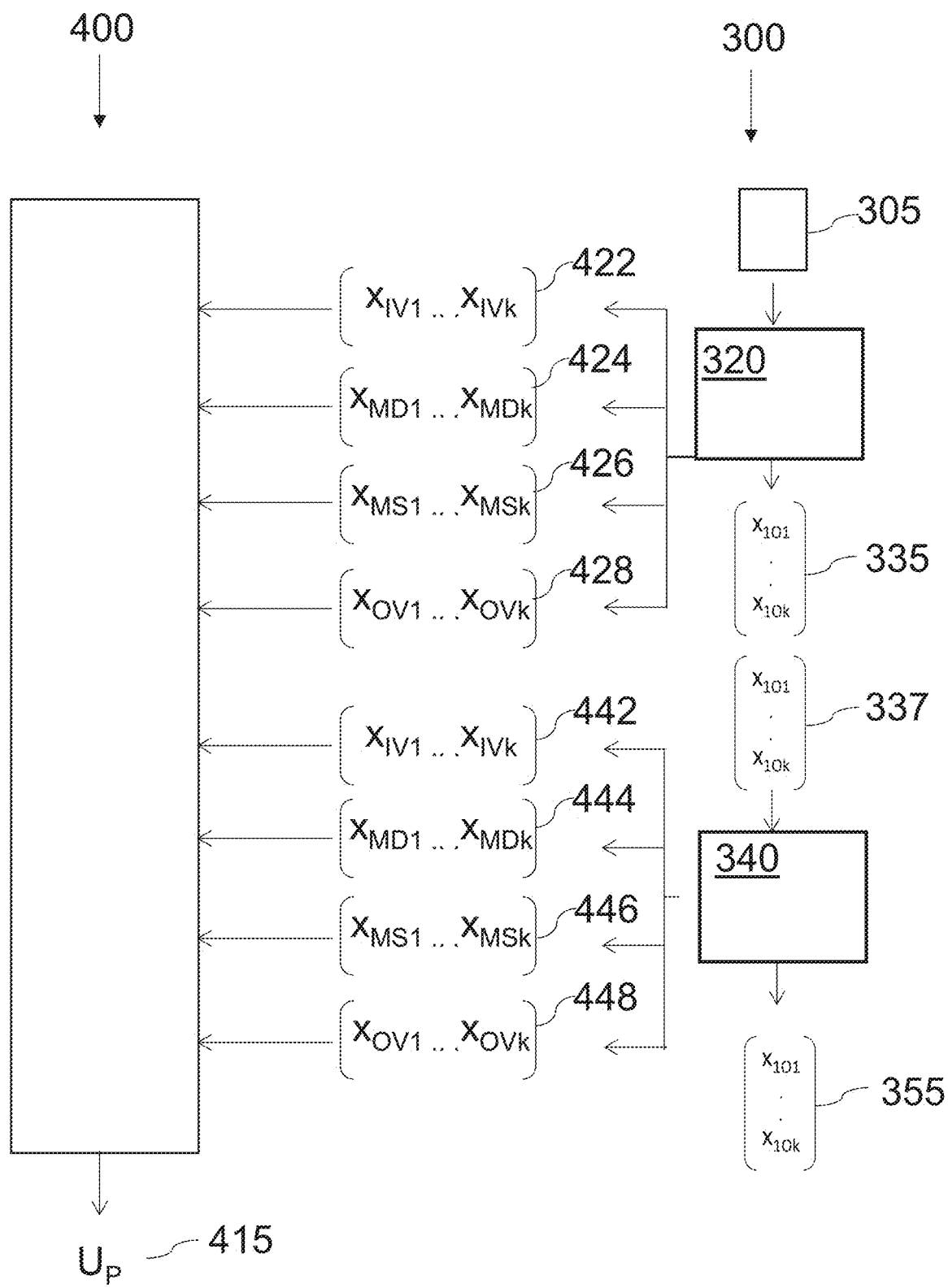
FIG. 4 depicts a schematic diagram of an uncertainty quantifier used with the sequence of models of FIG. 3 in accordance with non-limiting embodiments of the present technology.

With reference to FIG. 4, there is shown a schematic diagram of an uncertainty quantifier 400 used with the sequence of models 300 of FIG. 3 in accordance with non-limiting embodiments of the present technology.

In some non-limiting embodiments of the present technology, the uncertainty quantifier 400 is executed by the training server 240.

The uncertainty quantifier 400 is implemented as an MLA. The type of MLA of the uncertainty quantifier 400 is not limited.

In one embodiment, the uncertainty quantifier 400 is a NN. In another embodiment, the uncertainty quantifier 400 may be a convolutional neural network (CNN). In another embodiment, the uncertainty quantifier 400 may be a long short-term memory (LS™) network.

The uncertainty quantifier 400 is configured to receive the digital document 305, the set of first model output features 335, the set of second model input features 337 and the set of second model output features 355. The uncertainty quantifier 400 is configured to model confidence of the predictions or output features of the sequence of models 300 by receiving and/or determining, for a given model of the sequence of models 300: input validation features, metadata features, model-specific features, output validation features. It should be noted that the uncertainty quantifier 400 may acquire one or more of the features for each of the models in the sequence of models 300.

The uncertainty quantifier 400 may be trained based on one or more of: the input validation features, the metadata features, the model-specific features, and the output validation features of one or more models of the sequence of models 300 by using a training set, where the target is a binary variable associated with a correct (y=1) or incorrect (y=0) prediction.

In other embodiments, the target may be an amplitude of the error made by the sequence of models 300 or at least a portion of the models in the sequence of models 300.

In one embodiment, the uncertainty quantifier 400 may transmit, via the API 225 of the prediction server 220, an indication which causes the sequence of models 300 to transmit one or more of the input validation features, metadata features, model-specific features and output validation features. In one embodiment, the uncertainty quantifier 400 may transmit training objects in the form a set of labelled digital documents (not shown) to the sequence of models 300, from which it has already extracted some of the features discussed above, and observe behavior of each of the models in the sequence of models 300 with regard to the features.

In another embodiment, the uncertainty quantifier 400 may determine one or more of the input validation features, metadata features, model-specific features and output validation features, as a non-limiting example based on the digital document 305, the set of first model output features 335, the set of second model input features 337 and the set of second model output features 355.

Input Validation Features

The uncertainty quantifier 400 is configured to receive input validation features from a given model of the sequence of models 300. In one embodiment, the uncertainty quantifier 400 is configured to determine and/or receive input validation features 422 from the first model 420 and/or input validation features 442 from the second model 440. The input validation features 422, 442 are features which measure if the input features of the sequence of models 300 have the right format for processing. Input validation features 422 depend on the input features received by the sequence of models 300.

In one embodiment, the uncertainty quantifier 400 may determine the input validation features 422, 442 based on the second set of training objects. As a non-limiting example, the uncertainty quantifier 400 may infer that a given input feature has a specific format or characteristics which impact the prediction ability of the sequence of models 300.

As a non-limiting example, in embodiments where the digital document 305 is an image, the input validation features 422, 442 may specify the size of the image in pixels.

In one embodiment, the input validation features 422, 442 are data-specific. For example, if the digital document 305 is an image, the input validation features 422 may indicate if the image is blurry.

In one embodiment, the input validation features 422, 442 may indicate if the input features are out-of-distribution. As a non-limiting example, the uncertainty quantifier 400 may determine that input features are out-of-distribution based on the training phase of the sequence of models 300 or the training objects supplied thereto.

In one embodiment, at least a portion of the input validation features 422, 442 may be specified by an operator.

Metadata Features

The uncertainty quantifier 400 is configured to receive metadata features from a given model of the sequence of models 300. In one embodiment, the uncertainty quantifier 400 is configured to determine and/or receive metadata features 424 from the first model 320 and/or metadata features 444 from the second model 340. The metadata features 424, 444 are features that may not be directly used by the sequence of models 300, but may be useful in understanding performance of the sequence of models 300 in its predictions.

As a non-limiting example, in embodiments where the document is an image, the metadata features 424, 444 may indicate aperture value, brightness value, ISO values, location, time of day, authors, and the like, which may not be directly used by the sequence of models 300.

In one embodiment, the uncertainty quantifier 400 may receive the metadata features 424 and 444 from the database 230.

Model-Specific Features

The uncertainty quantifier 400 is configured to receive model-specific features from a given model of the sequence of models 300. In one embodiment, the uncertainty quantifier 400 is configured to determine and/or receive model-specific features 426 from the first model 320 and/or model-specific features 446 from the second model 340. The model-specific features 426, 446 are features specific to each model of the sequence of models 300. Generally speaking, the model-specific features 426 comprise one or more of: output features, intermediate features, uncertainty features, and top error features.

As a non-limiting example, the model-specific features 426, 446 may comprise one or more of: the set of first model parameters 325 and the set of second model parameters 345.

In one embodiment, the model-specific features 426, 446 comprise features output by a given model in the sequence of models 300, which may or may not be used by other models in the sequence of models 300 and which may or may not be directly present in the final output of the sequence of models 300. As a non-limiting example, the models-specific features may comprise features in the set of second model input features 337 not used by the second model 340.

In one embodiment, the model-specific features 426, 446 comprise intermediate features used internally by a given model in the sequence of models 300.

As a non-limiting example, in embodiments where the given model is a neural network, the model-specific features 426, 446 may comprise values output by one or more of the layers of the NN, the activation functions, and the like. As another non-limiting example, in embodiments where the given model is a heuristic, the model-specific features 426 may comprise the path of the data.

In one embodiment, the model-specific features 426, 446 comprise model-specific uncertainty features or the uncertainty parameter output by a given model in the sequence of models 300. In some embodiments, a given model may provide a metric associated with a prediction, which represents the uncertainty of its prediction. It should be noted that in some embodiments the uncertainty features may not be used directly by the sequence of models 300. In some embodiments, the model-specific features include one or more of: soft-max probabilities, monte-carlo (MC) dropout, prior networks, ensemble methods, kl divergence, temperature scaling, distribution of the probabilities between different potential predictions.

In some embodiments, the model-specific features 426, 446 comprising the uncertainty features enable the uncertainty quantifier 400 to quantify uncertainty in the sequence of models 300 more accurately.

In one embodiment, the model-specific features comprise top error features of a given model in the sequence of models 300. The top error features are indicative of conditions over which a given model of the sequence of models 300 is likely to fail. As a non-limiting example, the top error features may be extracted from training objects for which the sequence of models 300 performs less accurately.

In one embodiment, the uncertainty quantifier 400 acquires the model-specific features via the API 225 of the prediction server 220.

Output Validation Features

The uncertainty quantifier 400 is configured to receive or determine output validation features from a given model of the sequence of models 300. In one embodiment, the uncertainty quantifier 400 is configured to determine and/or receive output validation features 428 from the first model 320 and/or output validation features 448 from the second model 340.

In one embodiment, the output validation features are features which measure if the final output of the sequence of models 300, i.e. the set of second model output features 355, have a typical acceptable format. The uncertainty quantifier 400 may infer the format of the final output during training.

Generally, once the sequence of models 300 has been trained and validated on a first set of training objects (not shown), the uncertainty quantifier 400 has access to a second set of training objects (not shown) which will be used to assess uncertainty of the sequence of models 300 and train the uncertainty quantifier 400. The second set of training objects may have at least a portion of objects that is similar to the first set of training objects. In other embodiments, the second set of training objects (not shown) comprises more out-of-distribution training objects, such as training objects that may cause the sequence of models 300 to output less accurate predictions due to various factors.

After the training phase, the uncertainty quantifier 400 can assess uncertainty of the sequence of models 300 based on at least a portion of one or more of: the digital document 305, the set of first model output features 335, the set of second model output features 355, the input validation features 422, 442, the metadata features 424, 444 the model-specific features 426, 446 and the output validation features 428, 448.

The uncertainty quantifier 400 is configured to estimate, based one or more of: the digital document 305, the set of first model output features 335, the set of second model output features 355, the input validation features 422, 442, the metadata features 424, 444, the model-specific features 426, 446 and the output validation features 428, 448, the uncertainty of the sequence of models 300 by outputting an uncertainty parameter 415. The uncertainty parameter 415 is thus indicative of the "total uncertainty" of the sequence of models 300, which may be greater than the sum of the individual uncertainties of the models in the sequence of models 300.

In one embodiment, once trained, the uncertainty quantifier 400 can be in data communication with the sequence of models 300 via the API 225 and track uncertainty of the predictions output by the sequence of models 300. In embodiments where the uncertainty parameter is non-binary, there may be threshold associated with the uncertainty parameter.

Thus, the uncertainty quantifier 400 may assess at run time if the predictions of the sequence of models 300 are correct or incorrect. In one embodiment, the uncertainty quantifier 400 may track, and thus detect errors in predictions each time the sequence of models 300 processes an input.

In one embodiment, the uncertainty quantifier 400 may access an API (not shown) which may enable operator(s) to assess and interpret some of the features used by the uncertainty quantifier 400, and thus understand why the sequence of models 300 outputs erroneous predictions for example.

The predictions may be flagged to be reviewed by an operator for example. In one embodiment, the errors in predictions may be used to fine-tune the sequence of models 300, and active learning may be performed on the sequence of models 300. In other embodiments, the uncertainty quantifier 400 may track and flag the inputs resulting in the errors in prediction and generate training objects for MLAs.

Form Extractor

Figure 5:
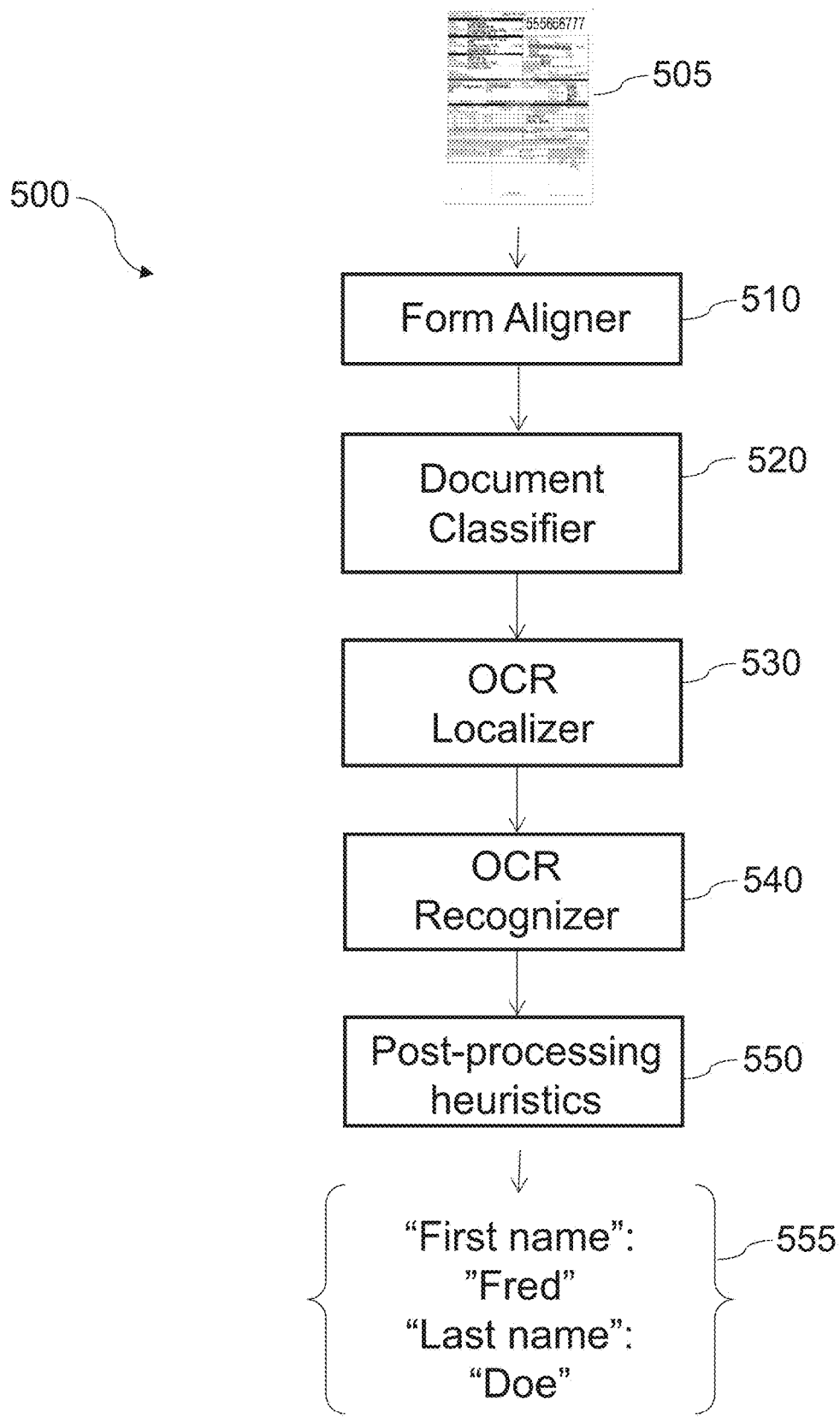
FIG. 5 depicts a schematic diagram of a sequence of models in the form of a form extractor in accordance with non-limiting embodiments of the present technology.

Now turning to FIG. 5, there is shown a schematic diagram of a sequence of models in the form of a form extractor 500 in accordance with non-limiting embodiments of the present technology.

The form extractor 500 is executed by the training server 240. In one embodiment, the training server 240 may provide the form extractor 500 to other electronic devices, such as the prediction server 220, via the API 225. In one embodiment, the prediction server 220 may transmit data and retrieve data from the form extractor 500 through the API 225

Generally speaking, the form extractor 500 is configured to receive as an input a digital structured document 505, and to process the digital structured document 505 to output a plurality of text sequences 555.

The digital structured document 505 is generally a digital representation of a structured document, i.e. a document including text sequences disposed in a relatively organized manner. In one embodiment, text in the digital structured document 505 may be divided in sections, may be organized in hierarchies, may include lists, tables, paragraphs, flow charts, and fields. As a non-limiting example, the digital structured document 505 may be at least a portion of a receipt, an application form, a report, an official record, an identity card, and the like. In one embodiment, the digital structured document 505 is an application form having been filled by an entity such as a user or a company.

As a non-limiting example, the digital structured document 505 may have been scanned, may have been photographed, or may have been computer generated to be represented in a digital format. It should be noted that the digital structured document 505 may be represented in a variety of digital formats such as, but not limited to EXIF, TIFF, GIF, JPEG, PDF and the like.

The form extractor 500 comprises inter alia a form aligner 510, an optional document classifier 520, an OCR localizer 530, an OCR recognizer 540, and post-processing heuristics 550.

The form aligner 510 is configured to align the digital structured document 505. As a non-limiting example, a given digital structured document 505 may be a photograph or scan taken from a specific angle, or rotated. The form aligner 510 may thus detect geometric features such as edges in the given digital structured document 505 and align the digital structured document 505 by performing mathematical transformations to output an aligned digital structured document (not shown). The form aligner 510 may be an MLA having been trained to align digital structured documents.

The form aligner 510 enables aligning the digital structured document 505 for further processing downstream and minimize errors from other models of the form extractor 500.

The document classifier 520 is configured to classify the digital document 305 in one or more categories. In one embodiment, the document classifier 520 is a binary classifier. In another embodiment, the document classifier 520 is a multiclass classifier. In one embodiment, the document classifier 520 is optional, as a non-limiting example when digital structured documents provided to the form extractor 500 are always of one category or type. The document classifier 520 is a classifier MLA having been trained to classify digital structured documents based on features thereof. The document classifier 520 may thus output a category (not shown) of the digital structured document 505, which may be binary or multiclass. In one embodiment, the document classifier 520 outputs a confidence score of the predicted category.

The OCR localizer 530 is configured to localize field names and structured elements in the digital structured document 505. In one embodiment, the structured elements may include bounding boxes. The OCR localizer 530 may then output each localized field name and coordinates of the structured element. As a non-limiting example, the OCR localizer 530 may extract the field names: "first name", "last name" "phone number" and "workplace" and corresponding coordinates of bounding boxes.

In one embodiment, the OCR localizer 530 may be an MLA. In one embodiment, the OCR localizer may provide a respective uncertainty score (not shown). The uncertainty score may be a confidence score of the with regard to the extracted field names and/or the coordinates of the bounding boxes.

The OCR localizer 530 outputs the field names and the coordinates of the bounding boxes of the digital structured document 505.

The OCR recognizer 540 is configured to extract content of the structured elements based of the digital structured document 505 localized by the OCR localizer 530. In one embodiment, the OCR recognizer 540 is a NN with a connectionist temporal classification (CTC) layer. In another embodiment, the OCR localizer 530 may use Monte Carlo methods. In one embodiment, the OCR localizer 530 determines a confidence score for each of the coordinates of the bounding boxes.

It is contemplated that the OCR localizer 530 may be integrated with the OCR recognizer 540.

In one embodiment, the OCR recognizer 540 comprises a decoder and an encoder. As a non-limiting example, the encoder of the OCR recognizer 540 may process the output of the previous models of the form extractor 500 to obtain a 3D encoded image indicative of semantic and spatial features of the digital structured document 505, and the decoder of the OCR recognizer 540 may decode the 3D encoded image to obtain a set of textual entities and sequences therefrom.

The post-processing heuristics 550 comprise one or more heuristics used to process data output by the previous models to output the set of final predictions, or the set of text sequences 555. In one embodiment, the set of text sequences 555 comprise the field names, associated identified entries and entities. In one embodiment, the post-processing heuristics 550 may correct typical errors output by the OCR recognizer 540 by using regular expression (RegEx).

As a non-limiting example, the post-processing heuristics 550 may output the set of text sequences 555 as an array comprising information in the digital structured document 505: {"First name": "Fred", "Last name": Doe, . . . , "Age": "29" }.

The form extractor 500 outputs a set of text sequences 555 from the digital structured document 505.

Generally speaking, the form extractor 500 is trained and validated on a set of training objects comprising labelled digital structured document using methods known in the art.

Form Extractor Uncertainty Quantifier

Figure 6:
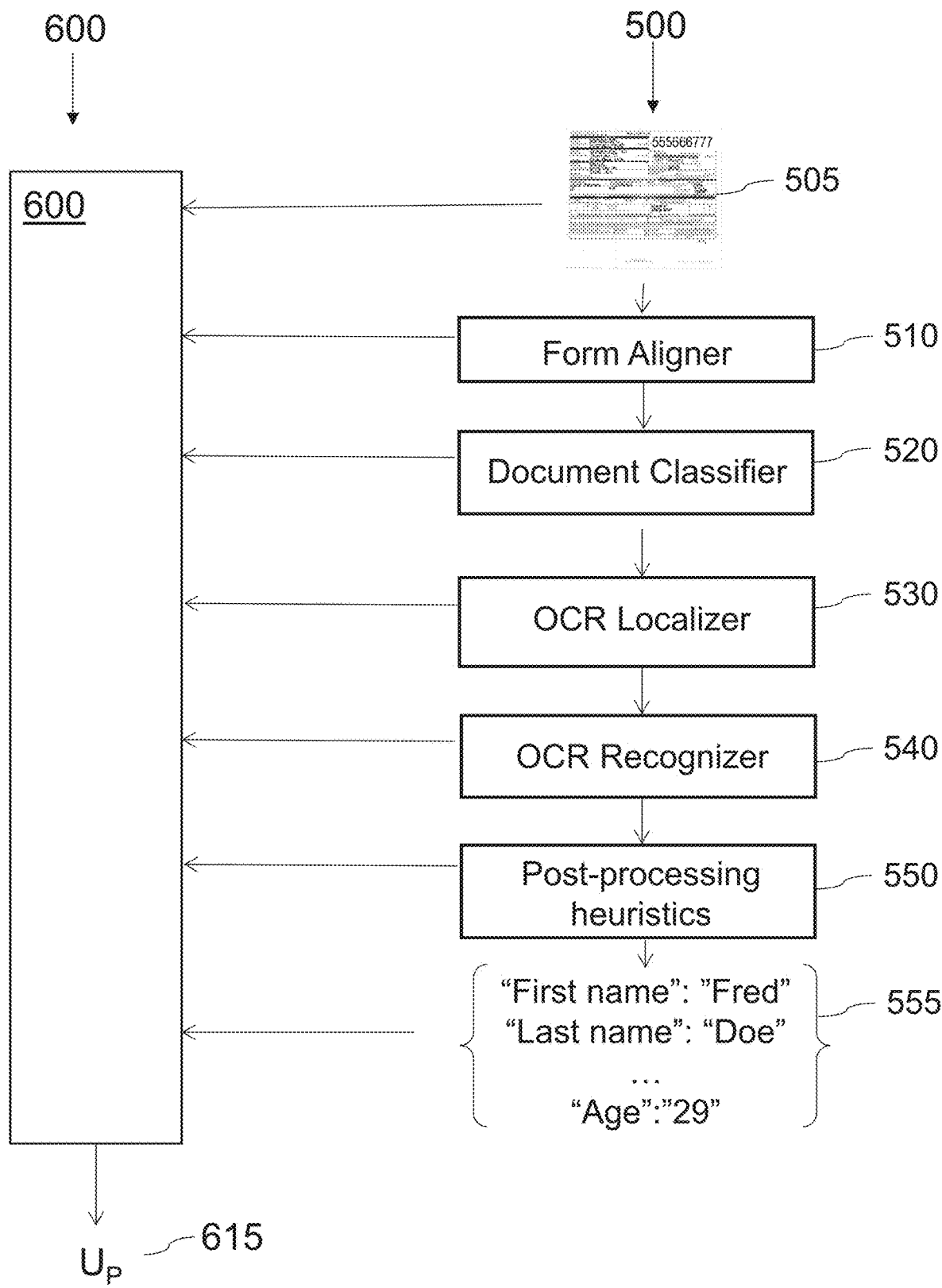
FIG. 6 depicts a schematic diagram of an uncertainty quantifier used with the form extractor of FIG. 5 in accordance with non-limiting embodiments of the present technology.

Now turning to FIG. 6, there is shown a schematic diagram of a form extractor uncertainty quantifier 600 in communication with the form extractor 500 of FIG. 5 in accordance with non-limiting embodiments of the present technology.

The form extractor uncertainty quantifier 600 is an embodiment of the uncertainty quantifier 400 adapted to the form extractor 500 described with reference to FIG. 5, which is an embodiment of the sequence of models 300.

Generally speaking, form extractor uncertainty quantifier 600 is configured to receive, from the form extractor 500, one or more of: (i) input features; (ii) predicted or output features having been predicted by a given model using the input features; and (iii) metric representation of a state of the given model at the moment of predicting the output features. The metric representations of the state of the given model may be the given model uncertainty parameter.

In another embodiment, the form extractor uncertainty quantifier 600 may be a long short-term memory (LSTM) network. In yet another embodiment, the form extractor uncertainty quantifier 600 comprise a convolutional neural network (CNN).

It should be noted that a given model of the form extractor 500 refers to one of the form aligner 510, the document classifier 520, the OCR localizer 530, the OCR recognizer 540, and the post-processing heuristics 550.

The form extractor uncertainty quantifier 600 is configured to output an uncertainty parameter of the form extractor 500.

In another embodiment, the form extractor uncertainty quantifier 600 is a binary classifier, and the uncertainty parameter is in the form of a binary variable, where 1 corresponds to a correct prediction of the form extractor 500, and where 0 corresponds to an incorrect prediction of form extractor 500.

In another embodiment, the form extractor uncertainty quantifier 600 is a multiclass classifier, and the uncertainty parameter 615 may have at least three possible categories indicating a confidence of the predictions of the form extractor 500.

In yet another embodiment, the uncertainty parameter 615 may be in the form of a confidence score.

Generally speaking, the form extractor uncertainty quantifier 600 is implemented as a type of MLA that is interpretable, such that the output of the form extractor uncertainty quantifier 600 is may be analyzed.

In one embodiment, the form extractor uncertainty quantifier 600 can be a gradient boosted decision tree. As a non-limiting example, the gradient boosted decision tree may be XGBoost. The form extractor uncertainty quantifier 600 may be trained using stochastic gradient descent.

In one embodiment, the form extractor uncertainty quantifier 600 receives input validation features from the form extractor 500. The input validation features comprise features such as: amount of pixels of the digital structured document 505, a contrast metric of the digital structured document 505, and layers of the OCR recognizer 540 or OCR localizer 530 representing the form.

In one embodiment, the form extractor uncertainty quantifier 600 receives model-specific features of the form extractor 500. In one embodiment, the model-specific features comprise uncertainty scores output by one or more of the OCR recognizer 540, the OCR localizer 530, and the form aligner 510.

In one embodiment, the model-specific features comprise the model parameters (i.e. parameters and hyperparameters) of one or more models in the form extractor 500.

In one embodiment, the form extractor uncertainty quantifier 600 receives output validation features of the form extractor 500.

In one embodiment, the form extractor uncertainty quantifier 600 receives from the form aligner 510, alignment values or number of degrees and output probabilities of predicted corners of the aligned digital structured document.

In one embodiment, the form extractor uncertainty quantifier 600 receives, from the document classifier 520, the classifier output probabilities.

In one embodiment, the form extractor uncertainty quantifier 600 receives, from the OCR localizer 530, probabilities associated with the detected structured element or bounding boxes, log of probabilities of the top predictions using max decoding, log probabilities of the top K predictions output by CTC decoding, temperatures parameters associated with the probabilities, as well as mean and variances of the probabilities.

In one embodiment, the form extractor uncertainty quantifier 600 receives, from the post-processing heuristics, an indication if the output matches the expected regex.

In one embodiment, the form extractor uncertainty quantifier 600 receives, for each identified field by the form extractor 500, a length of the output predictions. In one embodiment, the form extractor uncertainty quantifier 600 learns an output validation format based on the outputs during the training.

As a non-limiting example, for a field identified as a postal code, the form extractor uncertainty quantifier 600 may receive an output validation feature of six characters, (i.e. a postal code has usually 6 characters), a relative number of alphabetic vs numerical characters, number of capital letters, and threshold in the numerical values (i.e. dates).

It should be noted that performance of the form extractor uncertainty quantifier 600 depends on the data granularity. As a non-limiting example, if the structured document 505 has a typical structure, i.e. a form comprising specific fields, the granularity and performance of the form extractor uncertainty quantifier 600 may be increased, but the form extractor uncertainty quantifier 600 may not be generalized to other types of structures.

In another embodiment, during training, context may be provided as features in the training documents, for example specific field names, which may enable the form extractor uncertainty quantifier 600 to learn the type of output and the error rate that should be expected.

Method Description

Figure 7:
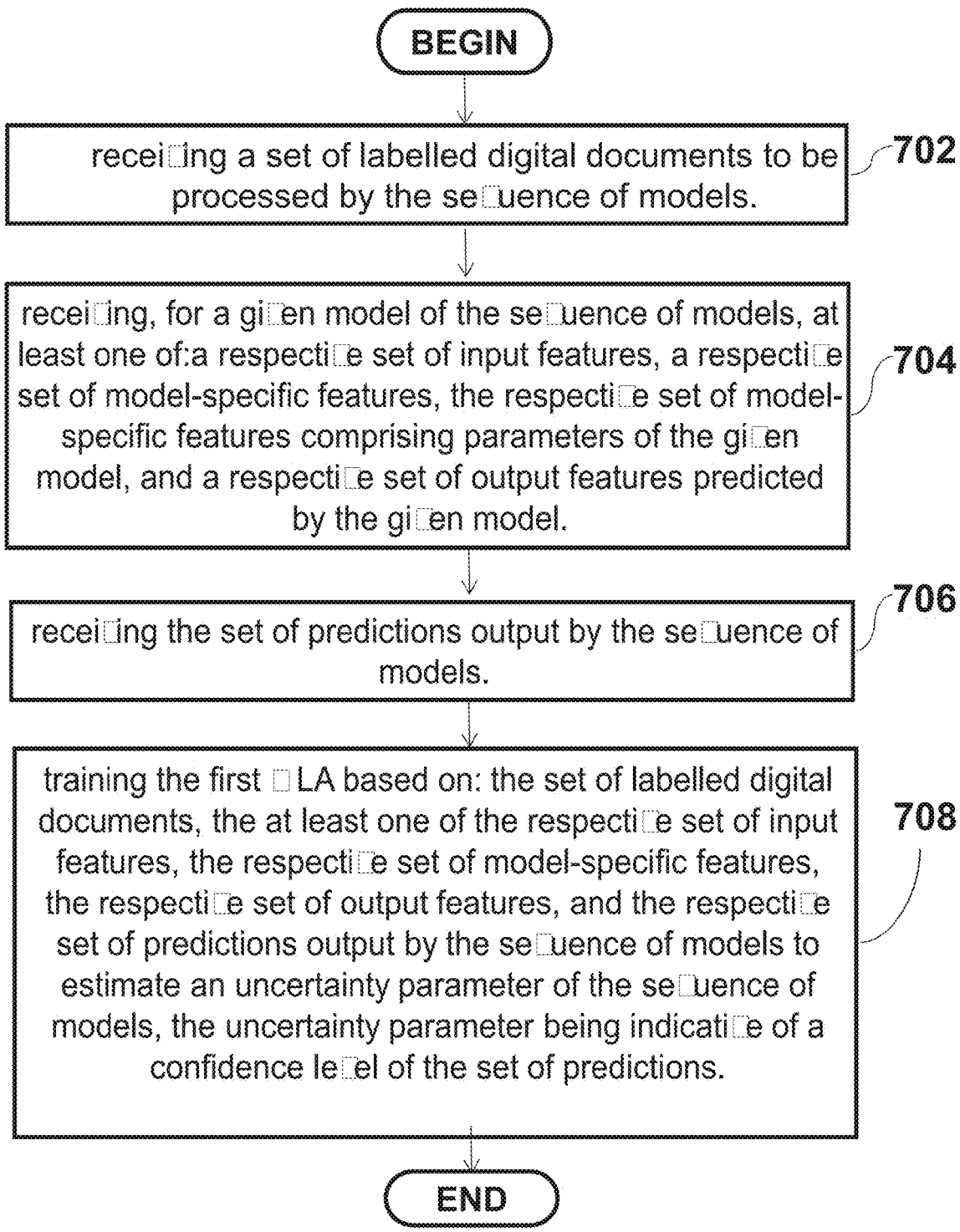
FIG. 7 depicts a flow chart of a method of training a first machine learning algorithm for estimating an uncertainty parameter of a sequence of models in accordance with non-limiting embodiments of the present technology.

FIG. 7 depicts a flowchart of a method 700 of training a first machine learning algorithm for estimating uncertainty of a sequence of models 300 in accordance with non-limiting embodiments of the present technology.

In one embodiment, the training server 240 comprises a processor 110 operatively connected to a non-transitory computer readable storage medium such as the solid-state drive 120 and/or the random-access memory 130 storing computer-readable instructions. The processor 110, upon executing the computer-readable instructions, is configured to execute the method 700 for training a first machine learning algorithm in the form of the uncertainty quantifier 400.

The training server 240 is in data communication with the prediction server 220, the prediction server 220 executing the sequence of models 300. In one embodiment, the sequence of models 300 is the form extractor 500, and the uncertainty quantifier 400 is the form extractor uncertainty quantifier 600. The sequence of models 300 has been trained to output predictions based on features of a digital document 305 received as an input.

The method 700 begins at processing step 702.

STEP 702: receiving a set of labelled digital documents to be processed by the sequence of models.

At processing step 702, the training server 240 receives a set of labelled digital documents to be processed by the sequence of models 300. The set of labelled digital document is of the same nature of digital documents having been used to train the sequence of models 300.

In one embodiment, the set of labelled digital documents comprises a digital structured document such as the digital structured document 505 in the form of an image, where fields and filled text sequences have been labelled.

The method 700 advances to processing step 704.

STEP 704: receiving, for a given model of the sequence of models, at least one of:
  a respective set of input features,
  a respective set of model-specific features, the respective set of model-specific features comprising parameters of the given model, and
  a respective set of output features predicted by the given model.

At processing step 704, the sequence of models 300 processes the set of labelled digital documents via each of the models comprising at least a first model 320 and a second model 340, the first model 320 using the set of first model parameters 325 and the second model 340 using the set of second model parameter 345. At least one of the first model 320 and the second model 340 is an MLA.

In one embodiment, the set of labelled digital documents are provided by the training server 240 for processing by the sequence of models 300 executed by the prediction server 220. In one embodiment, the training server 240 provides the set of labelled digital documents via the API 225. In another embodiment, another electronic device (not depicted) connected to the prediction server 220 transmits the set of labelled digital documents to the sequence of models 300 for processing thereof. In one embodiment, the training server 240 transmits an indication to the prediction server 220, which stores the set of labelled digital documents, and the indication causes the prediction server 220 to process the set of labelled digital documents via the sequence of models 300.

The training server 240 receives, for a given model of the sequence of models 300, at least one of: a respective set of input features, a respective set of model-specific features, a respective set of output features predicted by the given model of the sequence of models 300.

In one embodiment, the training server 240 determines at least a portion of the input validation features 422, 442, the metadata features 424, 444 and the output validation features 428, 448 of the first model 320 and/or the second model 340 of the sequence of models 300.

In one embodiment, the respective set of model-specific features 426, 446 comprises the set of first model parameters 325 and/or the set of second model parameter 345. The model-specific features comprise model parameters and hyperparameters.

In one embodiment, the training server 240 receives a respective uncertainty parameter of the respective set of output features computed by the given model.

In one embodiment, the training server 240 determines at least a portion of the input validation features, the metadata features, and the output validation features.

The training server 240 may receive the features during processing by the given model of the sequence of models 300, or from the database 230 having stored the features during processing by the sequence of models 300. In one embodiment, the training server 240 receives the features, depending on the type of model, for each of the models in the sequence of models 300.

The method 700 advances to processing step 706.

STEP 706: receiving the set of predictions output by the sequence of models.

At processing step 706, the training server 240 receives the set of predictions output by the sequence of models 300. In one embodiment, the set of predictions is the set of second model output features 355.

The method 700 advances to processing step 708.

STEP 708: training the first MLA based on the set of labelled digital documents, the at least one of the respective set of input features, the respective set of model-specific features, the respective set of output features, and the respective set of predictions output by the sequence of computer-implemented models to estimate the uncertainty parameter of the sequence of computer-implemented models, the uncertainty parameter being indicative of a confidence level of the set of predictions.

At processing step 708, the training server 240 trains the first MLA in the form of the uncertainty quantifier 400 based on: the set of labelled digital documents, the at least one of: the respective set of input features, the respective set of model-specific features, the respective set of output features, and the respective set of predictions output by the sequence of models to estimate an uncertainty parameter 415 indicative of a confidence level of the set of predictions output the sequence of models 300. In one embodiment, the target of the uncertainty quantifier 400 is a binary variable, i.e. uncertainty quantifier 400 is trained to output the uncertainty parameter 415 in the form of a binary variable.

In one embodiment, the training server 240 trains the uncertainty quantifier 400 based on the input validation features 422, 442, the metadata features 424, 444, the model-specific features 426, 446 and the output validation features 428, 448.

In one embodiment, the training server 240 trains the uncertainty quantifier 400 using stochastic gradient descent.

The method 700 then ends.

It should be apparent to those skilled in the art that at least some embodiments of the present technology aim to expand a range of technical solutions for addressing a particular technical problem, namely improving performance of machine learning algorithms used in a sequence of models by quantifying the total uncertainty of the sequence of models based on learned features.

It should be expressly understood that not all technical effects mentioned herein need to be enjoyed in each and every embodiment of the present technology. For example, embodiments of the present technology may be implemented without the user enjoying some of these technical effects, while other non-limiting embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fiber-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting.

What is claimed is:

1. A computer-implemented method executed by a first server for training a first machine learning algorithm (MLA) for estimating an uncertainty parameter of a sequence of computer-implemented models executed by a second server, the sequence of computer-implemented models comprising at least one second MLA, the sequence of computer-implemented models having been trained on a set of training objects to output a set of predictions based on a set of input features, the second server being communicatively coupled to the first server, the method comprising:
   receiving, by the first server, a set of labelled digital documents to be processed by the sequence of computer-implemented models;
   receiving, by the first server, for a given model of the sequence of computer-implemented models, at least one of:
   a respective set of input features,
   a respective set of model-specific features, the respective set of model-specific features comprising parameters of the given model, and
   a respective set of output features predicted by the given model;
   receiving, by the first server, the set of predictions output by the sequence of computer-implemented models; and
   training, by the first server, the first MLA based on: the set of labelled digital documents, the at least one of the respective set of input features, the respective set of model-specific features, the respective set of output features, and the respective set of predictions output by the sequence of computer-implemented models to estimate the uncertainty parameter of the sequence of computer-implemented models, the uncertainty parameter being indicative of a confidence level of the set of predictions.

2. The method of claim 1, wherein the training comprises:
determining, by the first server, for the sequence of computer-implemented models, at least one of:
   input validation features, the input validation features being indicative of a format of the set of input features, and
   output validation features, the output validation features being indicative of a format of the set of predictions.

3. The method of claim 2, wherein
the method further comprises, prior to the training the first MLA:
   receiving, for the respective set of input features, metadata features, the metadata features not being used by the given model; and wherein
the training the first MLA is further based on the metadata features.

4. The method of claim 3, wherein the given model is the at least one second MLA.

5. The method of claim 4, wherein
the at least one second MLA comprises a neural network (NN); and wherein the model-specific features comprise: model parameters of the NN, hyperparameters of the NN, and intermediate features computed by the NN.

6. The method of claim 5, wherein the method further comprises, prior to the training the first MLA:
receiving, from the given model of the sequence of computer-implemented models, a respective uncertainty score associated with the respective set of output features, the uncertainty score being indicative of a confidence level the respective set of output features of the given model; and wherein
the training the first MLA is further based on the respective uncertainty score.

7. The method of claim 6, wherein the first MLA is a classification gradient boosted decision tree, and the uncertainty parameter is a binary variable; and wherein
the training the first MLA comprises performing stochastic gradient descent.

8. The method of claim 7, wherein:
a given digital document of the set of labelled digital documents comprises an image having structured elements; and
the sequence of computer-implemented models has been trained to determine bounding boxes from the image having the structured elements and output a set of text sequences using optical character recognition (OCR) on the image.

9. The method of claim 8, wherein the model-specific features comprise: log of probabilities of predictions of an OCR model in the sequence of computer-implemented models, and a mean and a variance of the log of probabilities of the predictions.

10. The method of claim 9, wherein the output validation features comprise at least one of: a length of characters of a given text sequence in the set of text sequences, a number of alphabetical characters of the given text sequence in the set of text sequences, and a number of numerical characters of the given text sequence in the set of text sequences.

11. A first server for training a first machine learning algorithm (MLA) for estimating an uncertainty parameter of a sequence of computer-implemented models executed by a second server, the sequence of computer-implemented models comprising at least one second MLA, the sequence of computer-implemented models having been trained on a set of training objects to output a set of predictions based on a set of input features, the second server being communicatively coupled to the first server, the first server comprising:
a processor; and
a non-transitory computer readable storage medium operatively connected to the processor, the non-transitory computer readable storage medium comprising instructions;
the processor, upon executing the instructions, being configured for:
receiving a set of labelled digital documents to be processed by the sequence of computer-implemented models;
receiving, for a given model of the sequence of computer-implemented models, at least one of:
a respective set of input features,
a respective set of model-specific features, the respective set of model-specific features comprising parameters of the given model, and
a respective set of output features predicted by the given model;
receiving the set of predictions output by the sequence of computer-implemented models; and
training the first MLA based on: the set of labelled digital documents, the at least one of the respective set of input features, the respective set of model-specific features, the respective set of output features, and the respective set of predictions output by the sequence of computer-implemented models to estimate an uncertainty parameter of the sequence of computer-implemented models, the uncertainty parameter being indicative of a confidence level of the set of predictions.

12. The first server of claim 11, wherein the training comprises: determining for the sequence of computer-implemented models, at least one of:
input validation features, the input validation features being indicative of a format of the set of input features, and
output validation features, the output validation features being indicative of a format of the set of predictions.

13. The first server of claim 12, wherein
prior to the training the first MLA, the processor is further configured for:
receiving, for the respective set of input features, metadata features, the metadata features not being used by the given model; and wherein
the training the first MLA is further based on the metadata features.

14. The first server of claim 13, wherein the given model is the at least one second MLA.

15. The first server of claim 14, wherein
the at least one second MLA comprises a neural network (NN); and wherein
the model-specific features comprise: model parameters of the NN, hyperparameters of the NN, and intermediate features computed by the NN.

16. The first server of claim 15, wherein
prior to the training the first MLA, the processor is further configured for:
receiving, from the given model of the sequence of computer-implemented models, a respective uncertainty score associated with the respective set of output features, the uncertainty score being indicative of a confidence level the respective set of output features of the given model; and wherein
the training the first MLA is further based on the respective uncertainty score.

17. The first server of claim 16, wherein
the first MLA is a classification gradient boosted decision tree, and the uncertainty parameter is a binary variable; and wherein
the training the first MLA comprises performing stochastic gradient descent.

18. The first server of claim 17, wherein:
a given digital document of the set of labelled digital documents comprises an image having structured elements; and wherein
the sequence of computer-implemented models has been trained to determine bounding boxes from the image having the structured elements and output a set of text sequences using optical character recognition (OCR) on the image.

19. The first server of claim 18, wherein the model-specific features comprise: log probabilities of predictions of an OCR model in the sequence of computer-implemented models, and a mean and a variance of the log probabilities of the predictions.

20. The first server of claim 19, wherein the output validation features comprise at least one of: a length of characters of a given text sequence in the set of text sequences, a number of alphabetical characters of the given text sequence in the set of text sequences, and a number of numerical characters of the text sequence in the set of text sequences.

\* \* \* \* \*